(12) United States Patent
Testardi

(10) Patent No.: US 9,953,038 B2
(45) Date of Patent: Apr. 24, 2018

(54) CLOUD-BASED HIERARCHICAL SYSTEM PRESERVATION

(71) Applicant: Microsoft Technology Licensing, LLC, Redmond, WA (US)

(72) Inventor: Richard Paul Testardi, Boulder, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 540 days.

(21) Appl. No.: 14/610,989

(22) Filed: Jan. 30, 2015

(65) Prior Publication Data

US 2016/0224433 A1 Aug. 4, 2016

(51) Int. Cl.
*G06F 17/30* (2006.01)
*G06F 11/14* (2006.01)

(52) U.S. Cl.
CPC .... *G06F 17/30221* (2013.01); *G06F 11/1451* (2013.01); *G06F 11/1453* (2013.01); *G06F 11/1469* (2013.01); *G06F 11/1471* (2013.01)

(58) Field of Classification Search
CPC .............................................. G06F 17/30221
USPC ...................................................... 707/649
See application file for complete search history.

(56) References Cited

U.S. PATENT DOCUMENTS

| | | | |
|---|---|---|---|
| 5,778,395 A | 7/1998 | Whiting et al. | |
| 7,613,750 B2 | 11/2009 | Valiyaparambil et al. | |
| 7,801,871 B2 | 9/2010 | Gosnell | |
| 7,900,002 B2 | 3/2011 | Lyon | |
| 8,176,018 B1 | 5/2012 | Bisson et al. | |
| 8,224,935 B1 | 7/2012 | Bandopadhyay et al. | |
| 8,447,734 B2 | 5/2013 | Kirshenbaum | |
| 8,452,932 B2 | 5/2013 | Pangal et al. | |
| 8,788,769 B2 | 7/2014 | Abercrombie et al. | |
| 2005/0114402 A1 | 5/2005 | Guthrie | |
| 2012/0143825 A1* | 6/2012 | Boehm | G06F 17/30073 707/648 |
| 2013/0246365 A1 | 9/2013 | Hornkvist | |
| 2014/0181016 A1 | 6/2014 | Whitehead et al. | |

OTHER PUBLICATIONS

"International Preliminary Report on Patentability Issued in PCT Application No. PCT/US2016/013501", dated Sep. 27, 2016, 6 Pages.
"International Search Report and Written Opinion issued in PCT Patent Application No. PCT/US2016/013501", dated May 2, 2016, 12 pages.

* cited by examiner

*Primary Examiner* — Joshua Bullock
(74) *Attorney, Agent, or Firm* — Workman Nydegger

(57) ABSTRACT

The efficient backing up of a hierarchical system in cloud blob storage. The hierarchical structure of the system as it existed at a prior instance in time is reconstructed. A change journal that represents changes in the file system that prior instant in time is then used to formulate an updated file system hierarchy as it exists at a second instant in time. An updated injected representation of the file system, and updated file system reversal information is then formulated and provided to cloud blob storage. The injected representation of the file system is a one-to-one function of the content of the file system, in that the reversal information can be used to recover the content of the file system. Injected representations of various nodes in the system hierarchy may also be remotely stored.

20 Claims, 9 Drawing Sheets

CLOUD-BASED HIERARCHICAL SYSTEM PRESERVATION

BACKGROUND

Computing systems often organize data into a hierarchical structure. For instance, file systems hierarchically organize files into directory structures. Databases are hierarchical in which individual records may be considered leaf nodes in the hierarchy, with upper levels in the hierarchy being groups of records and/or other groups. However, many other types of data are organized hierarchically as well.

In the case of a file system, an internal node in the hierarchical structure is a directory, whereas a leaf node in the hierarchical structure is a file (or perhaps rarely an empty directory). File systems often include operational files (e.g., executable files, or data files) for use by the operating systems and/or applications running thereon, or may include user data files (e.g., word processing documents, game save files, pictures, video, music, and the like).

Remote backup services offer to backup all or portions of hierarchical systems remotely. For instance, in a file system, the files may be compressed on the local system, dispatched to a remote location, and stored.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the efficient backing up of a hierarchical system (such as a file system or database) in cloud blob storage. The hierarchical structure of the hierarchical system as it existed at a prior instance in time is reconstructed. This might be accomplished using a prior injected representation of the hierarchical system and prior reversal information for the prior injected representation. A change journal that represents changes in the hierarchical system that occurred since the prior instant in time is then used to formulate an updated hierarchical system hierarchy as it exists at a second instant in time. An updated injected representation of the hierarchical system, and updated hierarchical system reversal information is then formulated and provided to cloud blob storage.

The injected representation of the hierarchical system is a one-to-one function of the content of the hierarchical system, in that the reversal information can be used to recover the content of the hierarchical system. The injected representation is obtained by subjecting the content of the hierarchical system to an injective function. Accordingly, an injected representation that is different than the injected representation that represents the hierarchical system is thus certainly not resulting from application of the injective function to the content of the hierarchical system. Conversely, an injected representation that is the same as the injected representation of the hierarchical system is thus statistically certain to have resulted from applying the injected representation to the content of the hierarchical system. In some embodiments, the injected representation of the entire hierarchical system might be provided to cloud blob storage in addition to injected representations of various nodes in the hierarchical system hierarchy. Higher level injected representations of higher nodes in the hierarchical system hierarchy may thus be constructed from injected representation of lower nodes in the hierarchical system hierarchy.

In accordance with the principles described herein, injective representations are determined for various nodes in the hierarchical system. While there is some dependency in terms of the order in which injected representation are determined (e.g., there is to first be an injected representations available for each child node of a parent node before the injected representation of the parent node is determined), there is also opportunity for high levels of concurrency. For instance, all of the leaf nodes (or at least the lowest level leaf nodes) each have no dependencies before their injected representation may be determined. Thus, the efficient parallelism in processing provided by a cloud environment (due to many available execution engines) enables efficient and fast construction bottom up (also called herein "rolling up") of the injective representation of portions or even all of the hierarchical system. For instance, the injective representations of the lowest level in the hierarchical system may be determined rapidly as compared to a single threaded operation performed outside of the cloud in a single execution engine.

The change journal allows for detection of changes at the leaves of the system hierarchy, which can then be efficiently rolled up (bottom-up) along with the injected representations of the unchanged nodes in the system hierarchy, into a new injected representation. Furthermore, from the new root injected representation of the root node in the system hierarchy, associated reversal information may be used to discover the injected representations of the next lower level of the system hierarchy. This may continue until the leaf nodes are encountered resulting in "unrolling" of the entire hierarchy. On the other hand, unrolling of the hierarchy may also be accomplished just with respect to one or more descendant paths of interest, avoiding work associated with data in the hierarchy that is not of interest. Accordingly, the injected representations combined with a system hierarchical structure allows for rapid addressing and discovery of any designated content from a backup, based only on the root injective representation (i.e., backup version) and the hierarchical path.

In accordance with some embodiments described herein, the cloud blob storage has a hierarchical system layout that matches the hierarchical system layout on the local system. This hierarchical matching allows the cloud to directly benefit from the change journal, since the change journal can be applied to the structure of the hierarchical system on the cloud storage just as well as it can on the local system.

The injected representations are also cryptographically secure without the associated reversal information. Deduplication can be accomplished by simply comparing to see if the same injective representation already exists, and if so, discard the duplicate. Again, this deduplication may be performed without revealing the content itself to the deduplication mechanism, since reversal information is not needed for deduplication. Such deduplication may not only occur at the leaf node (e.g., at the file or file portion, or at the record), but also at an intermediate node (e.g., a directory or group of records).

Furthermore, because injected representations of any and all nodes of the hierarchical structure can be obtained efficiently, two hierarchical structures may be compared to determine which nodes are different between the two hierarchical structures. Furthermore, this may be done without even looking at the underlying data within each node, but rather by just comparing whether the smaller injected representation are identical—which is an efficient and rapid compare operation on a small amount of data. This may be particularly useful when comparing versions of a hierarchical structure, to determine which nodes have changed in a particular time interval.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
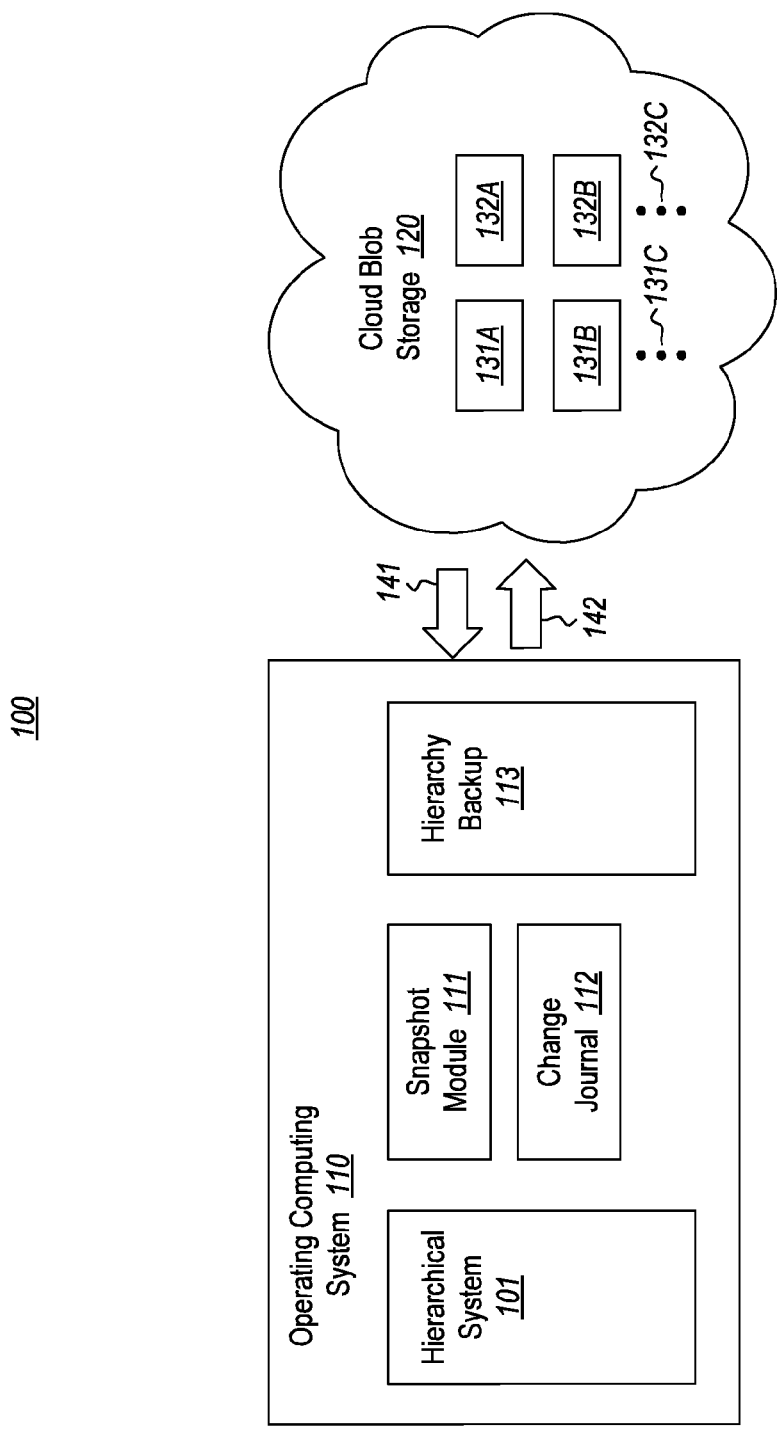
FIG. 1 illustrates a hierarchical system backup environment in accordance with one embodiment of the principles described herein.

At least some embodiments described herein relate to the efficient backing up of a hierarchical system (such as a file system or database) into cloud blob storage. The hierarchical structure of the hierarchical system as it existed at a prior instance in time is reconstructed. This might be accomplished using a prior injected representation of the hierarchical system and prior reversal information for the prior injected representation. A change journal that represents changes in the hierarchical system that occurred since the prior instant in time is then used to formulate an updated hierarchical system hierarchy as it exists at a second instant in time. An updated injected representation of the hierarchical system, and updated hierarchical system reversal information are then formulated and provided to cloud blob storage.

The injected representation of the hierarchical system is a one-to-one function of the content of the hierarchical system, in that the reversal information can be used to recover the content of the hierarchical system. The injected representation is obtained by subjecting the content of the hierarchical system to an injective function. Accordingly, an injected representation that is different than the injected representation that represents the hierarchical system is thus certainly not resulting from application of the injective function to the content of the hierarchical system. Conversely, an injected representation that is the same as the injected representation of the hierarchical system is thus virtually certain to have resulted from applying the injective function to the exact content of the hierarchical system. In some embodiments, the injected representation of the entire hierarchical system might be provided to cloud blob storage in addition to injected representations of various nodes in the hierarchical system hierarchy. Higher level injected representations of higher nodes in the hierarchical system hierarchy may be constructed from injected representation of lower nodes in the hierarchical system hierarchy.

In accordance with the principles described herein, injective representations are determined for various nodes in the hierarchical system. While there is some dependency in terms of the order in which injected representation are determined (e.g., there is to first be an injected representations available for each child node of a parent node before the injected representation of the parent node is determined), there is also opportunity for high levels of concurrency. For instance, all of the leaf nodes (or at least the lowest level leaf nodes) each have no dependencies before their injected representation may be determined. Thus, the efficient parallelism in processing provided by a cloud environment (due to many available execution engines) enables efficient and fast construction bottom up of the injective representation of portions or even all of the hierarchical system. For instance, the injective representations of the lowest level in the hierarchical system may be determined rapidly as compared to a single threaded operation performed outside of the cloud in a single execution engine.

The change journal allows for detection of changes at the leaves of the system hierarchy, which can then be efficiently rolled up (bottom-up) along with the injected representations of the unchanged nodes in the system hierarchy, into a new injected representation. Furthermore, from the new root injected representation of the root node in the system hierarchy, associated reversal information may be used to discover the injected representations of the next lower level of the system hierarchy. This may continue until the leaf nodes are encountered resulting in "unrolling" of the entire hierarchy. On the other hand, unrolling of the hierarchy may also be accomplished just with respect to one or more descendant paths of interest, avoiding work associated with data in the hierarchy that is not of interest. Accordingly, the injected representations combined with a system hierarchical structure allows for rapid addressing and discovery of any designated content from a backup, based only on the root injective representation (i.e., backup version) and the hierarchical path.

In accordance with some embodiments described herein, the cloud blob storage has a hierarchical system layout that matches the hierarchical system layout on the local system. This hierarchical matching allows the cloud to directly benefit from the change journal, since the change journal can be applied to the structure of the hierarchical system on the cloud storage just as well as it can on the local system.

The injected representations are also cryptographically secure without the associated reversal information. Deduplication can be accomplished by simply comparing to see if the same injective representation already exists, and if so, discard the duplicate. Again, this deduplication may be performed without revealing the content itself to the deduplication mechanism, since reversal information is not needed for deduplication. Such deduplication may not only occur at the leaf node (e.g., at the file or file portion, or at the record), but also at an intermediate node (e.g., a directory or group of records).

Furthermore, because injected representations of any and all nodes of the hierarchical structure can be obtained efficiently, two hierarchical structures may be compared to determine which nodes are different between the two hierarchical structures. Furthermore, this may be done without even looking at the underlying data within each node, but rather by just comparing whether the smaller injected representation are identical—which is an efficient and rapid compare operation on a small amount of data. This may be particularly useful when comparing versions of a hierarchical structure, to determine which nodes have changed in a particular time interval.

Although the subject matter has been and will be described in language specific to structural features and/or methodological acts, it is to be understood that the subject matter defined in the appended claims is not necessarily limited to the described features or acts described above, or the order of the acts described herein. Rather, the described features and acts are disclosed as example forms of implementing the claims.

FIG. 1 illustrates a hierarchical system backup environment 100 in accordance with one embodiment of the principles described herein. The hierarchical system backup environment 100 includes an operating computing system 110 on which a hierarchical system 101 is operating. The hierarchical system backup environment 100 also includes cloud blob storage 120 to which the hierarchical system 101 is to be backed up. The "cloud blob" storage is a term of art that describes a particular type of cloud storage in which stored data is primarily described by name, and is persisted primarily in binary format. Thus, cloud blob storage allows users to store binary objects (or "blobs") in a cloud environment. In accordance with the principles described herein, each node of the hierarchical system, including the entirety of the hierarchical system, may be represented by a corresponding blob.

The operating computing system 110 also includes a snapshot module 111, a change journal module 112 and a hierarchy backup manager 113. In this description and in the claims, the term "computing system" is defined broadly as including any computing system device or a distributed collection of collaborating computing systems. Accordingly, while some or all of the snapshot module 111, the change journal 112, and the hierarchy backup manager 113 may be located on the same physical system as the hierarchical system 101, that need not be the case. Furthermore, even the hierarchical system 101 itself may be distributed.

The principles described herein allow hierarchical systems (such as file systems or database systems) to be backed up and restored efficiently, while permitting opportunities for effective and automated de-duplication—particularly when data is shared. Essentially, each of the nodes of the hierarchical system, including the root directory, may be represented as an injected representation of the combination of an attribute (e.g., a name) of the node as well as the content of that node.

In order to define the term "injected representation", this description will first discuss the characteristics of an "injective function". An injective function is a function that preserves distinctness between an input domain and an output domain. In other words, for any possible input content from the input domain, there is but one possible output in the output domain, and no other distinct content from the input domain can generate the same output in the output domain. Using mathematical symbols, let $f$ be a function whose domain is a set A. The function $f$ is injective if and only if for all a and b in A, if $f(a)=f(b)$, then a=b. Equivalently, if a does not equal b, then $f(a) \neq f(b)$.

In this description and in the claims, a "statistically injective" function is a function that in which for all a and b in A, if f(a)=f(b), then with high probability a=b. High probability may be selected from the group consisting of 1) a virtually impossibility, 2) so improbable that even with a million selections of "a" and a million selections of "b" in domain A it is less likely than otherwise that there exists any selected "a" and any selected "b" such that f(a)=f(b), 3) so improbable that even with a billion selections of "a" and a billion selections of "b" in domain A it is less likely than otherwise that there exists any selected "a" and any selected "b" such that f(a)=f(b), 4) so improbable that even with a trillion selections of "a" and a trillion selections of "b" in domain A it is less likely than otherwise that there exists any selected "a" and any selected "b" such that f(a)=f(b), 5) any value less than or equal to $2^{-128}$, or 6) any value less than or equal to $2^{-256}$.

For instance, consider a SHA-256 hashing algorithm. There are $2^{256}$ (on the order of $10^{77}$) possible unique output values of such an algorithm. For scale, some estimates have the number of atoms in the observable universe to be on the order of from $10^{78}$ to $10^{82}$. Accordingly, the chance of two distinct values resulting in the same output value of a SHA-256 hashing algorithm is on the order of the chance that an atom might be selected at random from all of the atoms in the observable universe, and then upon re-performing the same random selection, finding that the same atom has again been selected. Such can be considered a virtual impossibility. In fact, even if this process is repeated a quadrillion ($10^{15}$) times to select a quadrillion atoms, the chance of any of those two atoms being the same remains a virtual impossibility, even considering the birthday paradox. Accordingly, a SHA-256 hashing algorithm may be considered a statistically injective function as the term is defined herein. Accordingly, in this description and in the claims, a "statistically injective function" may also be simply termed an "injective function". In this description and in the claims, an "injected representation" of particular content means a result of performing a statistically injective function on the particular content.

Note that exact perfection in the injective function is not required as the system may already have imperfections already. Accordingly, the statistical certainty in the injective function is sufficient such that any uncertainty is negligible given the small amount of uncertainty already present in any complex system.

Figure 2:
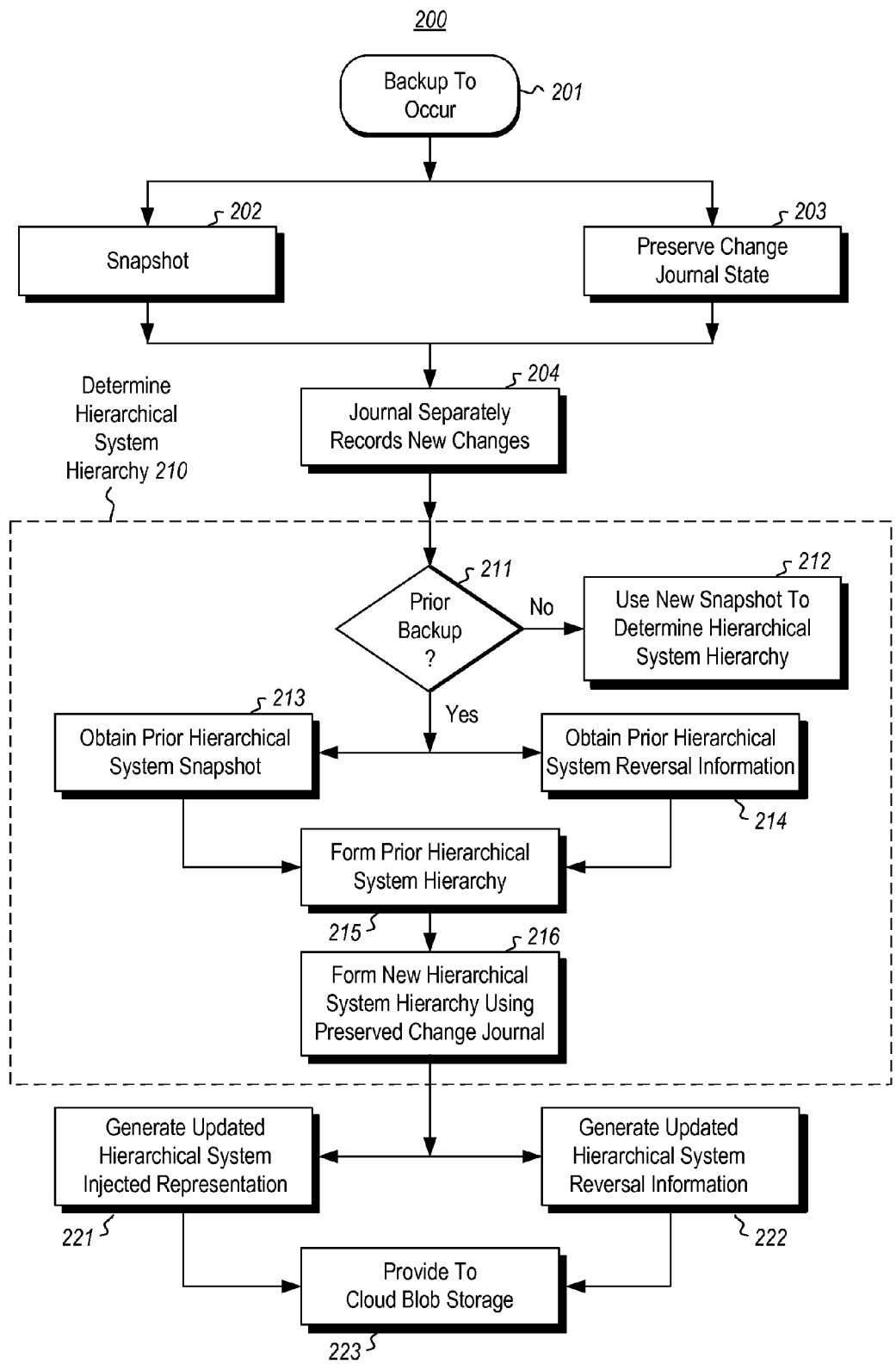
FIG. 2 illustrates a flowchart of a method for backing up a hierarchical system, which method may be performed by the backup environment of FIG. 1.

FIG. 2 illustrates a flowchart of a method 200 for backing up a hierarchical system. Optionally, the method 200 may be performed in the backup environment 100 of FIG. 1. Accordingly, the method 200 will now be described with frequent reference to the backup environment 100 of FIG. 1. The method 200 is performed in the context in which the snapshot module 111 has taken a previous snapshot of the file system, and the change journal 112 has tracked at least some changes that have been imposed on the hierarchical system since the previous snapshot. However, variations of the method 200 may be performed even when there has been no prior snapshot of the hierarchical system 101 taken. Such variations will also be described further below.

The hierarchy backup manager 113 performs the work of backing up in response to a determination that the hierarchical system 101 is to be backed up (act 201). The principles described herein are not limited to any mechanism or policy for how the hierarchy backup manager 113 makes this determination to back up the hierarchical system 101. Typical back up policies may be responsive to detection of certain events, the passage of an interval of time since the last backup, combinations thereof, and so forth. However, since the principles described herein allow backup of the hierarchical system (or portions thereof) to be efficiently performed (perhaps on the order of mere minutes, seconds or fractions of a second), backup might be more frequently than conventional hierarchical system backup systems might normally allow. In some embodiments, the hierarchical system backup might occur as often as a hierarchy is saved (either explicitly by the user, or through auto-saving operation) after editing. This may also be thought of as checking in the changes to a source control system.

As part of the backup operation, the snapshot module 111 may take a snapshot (act 202) of the hierarchical system as it exists at the time that the backup was determined to initiate. The determination that the backup is to occur (act 201) also triggers the change journal to preserve its state as it existed as of the time of the new snapshot (act 203). This state represents changes that have occurred until the point of the new snapshot since a prior snapshot of the hierarchical system. After the new snapshot is taken (act 202) and the change journal is preserved (act 203), the change journal begins recording new changes (act 204) that have occurred since the new snapshot was taken. The new changes may be used for a subsequent backup when the method 200 is performed on a future backup iteration.

The hierarchy backup manager 113 determines a state of the hierarchical system hierarchy (act 210) as it exists at the time the backup snapshot was taken (in act 202). If there has been no prior backup of the hierarchical system 101 taken ("No" in decision block 211), then perhaps the snapshot (taken in act 202) may be used directly (act 212) to determine the hierarchical system hierarchy. Alternatively, perhaps the hierarchy backup manager 113 has constant awareness of the hierarchical system hierarchy at any point in time by tracking directory and file creation, deletions, and modifications.

On the other hand, if there has been a prior backup of the hierarchical system 101 taken ("Yes" in decision block 211), then a prior injected hierarchical system representation of the hierarchical system corresponding to the prior hierarchical system snapshot is obtained (act 213). Also, the prior file system reversal information corresponding to the prior file system snapshot is obtained (act 214).

Referring to FIG. 1, the prior injected representation 131A of the hierarchical system and the prior hierarchical system reversal information 132A are illustrated as having been stored in the cloud blob storage 120. Furthermore, the operating computing system 110 accessing of the prior injected hierarchical system representation 131A and the prior hierarchical system reversal information 132A is represented by arrow 141. This information may not need to be retrieved from the cloud. One optimization is to more efficiently retrieve this information from a cache of certain injected representations (and associated reversal information) recently written to (or read from) the cloud. These injective representations (and containing reversal information) are by definition idempotent without risk of coherency issues or currency. Thus, if an injective representation is in the cash, the injective representation can be used with no risk of it being incorrect.

As will be seen from the description below, generation of the injected hierarchical system representation and the hierarchical system reversal information occur as the result of the backup method 200. Accordingly, the prior injected hierarchical system representation 131A and the prior hierarchical system reversal information 132A were generated and stored in the cloud blob storage 120 via a prior exercise of the method 200.

The hierarchy backup manager 113 then formulates a hierarchical system hierarchy as that hierarchical system existed in the prior hierarchical system snapshot (act 215) using the prior injected hierarchical system representation 131 and the prior hierarchical system reversal information 132. Details regarding how this might be done will be described further below. However, recall that the injected hierarchical system representation 131 is a distinct one-to-one function (i.e., an injective function result) of the prior state of the hierarchical system. The hierarchical system reversal information is any information that would allow the reverse of the injective function to be performed on the injected representation of the hierarchical system to thereby again retrieve the prior content of the hierarchical system. At this point, however, only the hierarchical system hierarchy is formulated (e.g., the directory structure with the names of the directories and the names of the files representing leaf nodes of the file system hierarchy).

The hierarchy backup manager 113 then formulates a changed hierarchical system hierarchy (act 216) using those changes between the prior snapshot and the current snapshot. Recall that those changes were captured as of the current snapshot time in act 203. Those changes are then fed to the hierarchy backup manager 113. Basically, the process starts at the leaf nodes of the lowest level directories, recompute the injected representations, and then the higher level injected representations of their parent node can be determined. Then the analysis moves up to the next lower level of nodes, and incorporates new injective representations as well as the new injective representations computed at the previous lower level. Then we move up to the next higher level, and so on. So the order that changes are applied is arbitrary within a given level, and "lowest to highest" between levels. For this same reason, the change journal need not even record changes chronologically.

If a journal entry indicates that leaf node has been altered, then that leaf node is invalidated, meaning that that leaf node is marked as requiring backup. If a journal entry indicates that a leaf node is added, then that leaf node is also marked as to be backed up. If a file or directory is deleted, then that deletion is also marked as to be reflected in the backup. Any of these operations also result in change in the content of any of the nodes in the ancestral chain of the affected leaf node. Accordingly, in order to capture the current state of those directories in the ancestral chain, the content of those directories is backed up. However, due to the principles described herein, the backing up of such directories is not computationally intensive, does not require significant bandwidth between the operating computing system 110 and the cloud blob storage 120, and does not require significant amounts of storage space within the cloud blob storage 120.

In an alternative embodiment, the change journal is not used to detect node additions, deletions or renames. Instead, the hierarchical structure is traversed (without examining the content itself) in both the previous and current backup. Node identifiers are then used to preserve when a leaf node is renamed and are never reused, to determine which leaf node are new and which are old and which are renamed, moving from one backup to the next. This is equivalent to using a perfect change journal to record leaf node additions, deletions, and renames. However, this alternative embodiment does avoid some race conditions that exist when a leaf node is renamed multiple times between backups, and allows the change journal to be avoiding needing to record changes chronologically.

At this point, regardless of whether the hierarchical system backup is being performed for the first time ("No" in decision block 211), or is just an updated hierarchical system backup ("Yes" in decision block 212), the updated hierarchical system hierarchy has been formulated (act 212 or act 216). In either case, the hierarchy backup manager 113 generates an updated injected representation of the hierarchical system (act 221) by applying a statistically injective function to the hierarchical system content. While this might seem like an onerous and processing intensive task, using the principles described further below, this formulation of the updated injected file system representation may be performed rapidly and efficiently, especially when the file system has already been previously backed up for prior states. The compute of the injective function need not be performed (whether at the leaf node or any other node) if that node has not changed, since it was previously determined and cannot have changed. The hierarchy backup manager 113 also formulates (act 222) updated hierarchical system reversal information using the changed hierarchical system hierarchy.

The hierarchy backup manager 113 then causes the updated injected hierarchical system representation and the updated hierarchical system reversal information to be provided to the cloud blob storage 120 (act 223). For instance, in FIG. 1, the operating computing system 110 providing of the updated injected hierarchical system representation 131B and the updated hierarchical system reversal information 132B is represented by arrow 142. After this providing (represented by arrow 142), the updated injected hierarchical system representation 131B and the updated hierarchical system reversal information 132B are illustrated as being stored in the cloud blob storage 120.

Note that this method 200 may be repeated for each backup of the hierarchical system. In the next backup of the hierarchical system, the updated injected hierarchical system representation 131B and the updated hierarchical system reversal information 132B would play the role of the prior injected file system representation 131A and the prior hierarchical system reversal information 132A, respectively. Furthermore, the changes from the change journal would reference changes since the new backup, as opposed to the prior backup. Thus, the ellipses 131C represent that there may be multiple versions of injected hierarchical system representations of the hierarchical system 101 within the cloud blob storage 120. Likewise, the ellipses 132C represent that there may be multiple versions of hierarchical system reversal information within the cloud blob storage 120, each allowing recover to a different backed up version.

As previously mentioned, the hierarchy backup manager formulates an injective hierarchical system representation (act 221) and a hierarchical system reversal information (act 222) for the entire state of the hierarchical system as it existed at the time of the backup time. In one embodiment, in order to do so, the hierarchy backup manager formulates an injective hierarchical system representation for each node within the hierarchical system. Rather than perform the statistically injective function (e.g., the SHA-256 hash) on the entire contents at each level in the file system hierarchy, the hierarchy backup manager begins at the lowest leaf nodes in the hierarchical system hierarchy, and uses injected representations of child nodes in a particular directory in order to more quickly formulate the injected representation of the parent node.

Figure 3:
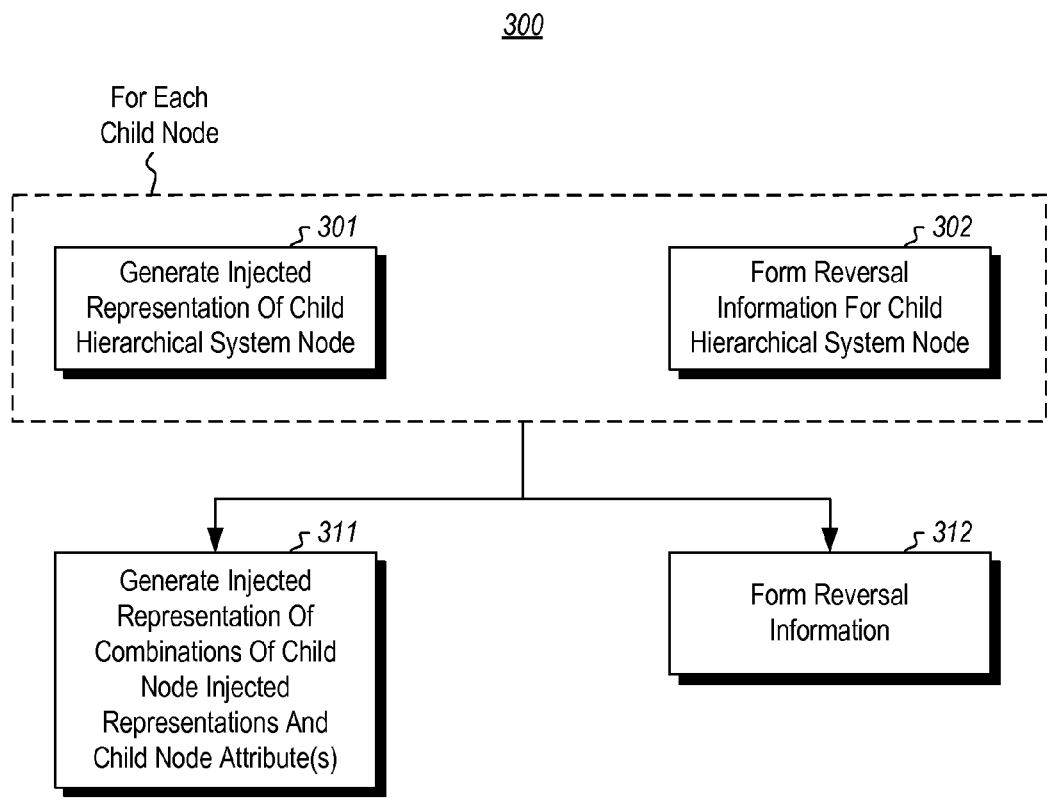
FIG. 3 illustrates a method for formulating an injected representation of a parent node in the hierarchical system, which method may be recursively repeated for each non-leaf node in the hierarchical system hierarchy.
Figure 4:
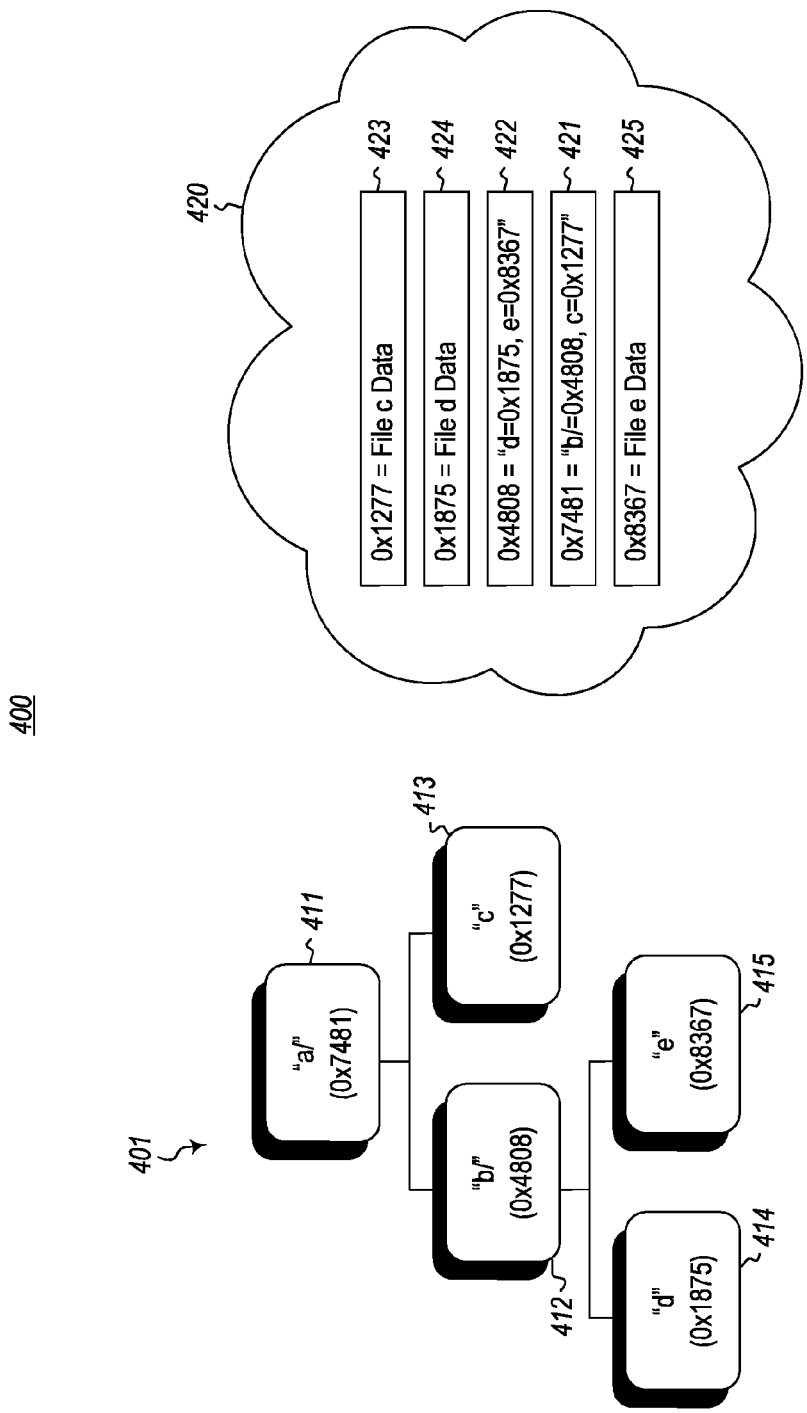
FIG. 4 illustrates an example environment that shows an example hierarchical system, in the form of a file system, hierarchy being backed up into the cloud blob storage.

FIG. 3 illustrates a method 300 for formulating an injected representation of a parent node (e.g., a directory) in the hierarchical system, which method may be recursively repeated for each non-leaf node in the file system hierarchy. FIG. 4 illustrates an example environment 400 that shows an example hierarchical system hierarchy in the form of a file system hierarchy 401 being backed up into the cloud blob storage 420. Accordingly, the method 300 will now be described with frequent reference to the example environment 400. The example file system hierarchy 401 is simple for clarity in describing the principles described herein. However, the principles described herein are not limited to the structure or complexity of the file system hierarchy. Some file system hierarchies may have many thousands or even millions of nodes (i.e., directories or files).

Since hashing is an effective mechanism for performing a statistically injective function, the performance of the statistically injective function will be hereinafter sometimes be referred to as "hashing", and the injected representation of content will be hereinafter sometimes be referred to as a "hashed" representation. In the illustrated example of FIG. 4, the hashed representation is a SHA-256 hash.

Assume for now, that this is the first time that the file system hierarchy 401 has been backed up. Before performing the method 300 for each non-leaf node, the hashes for each of the leaf nodes are obtained. More generally stated, a hash for a given node cannot be determined until the hashes for all of its child nodes are known, thus leading to bottom up hashing through the hierarchy. Typically, leaf nodes in a file system hierarchy are files, except in the unique case of an empty directory. In the example file system hierarchy 401, there are three leaf node files 413, 414, 415 called by names "c", "d", and "e", respectively.

Since the method 300 is performed recursively from bottom to top, the method 300 would first be performed with respect to the directory 412 (named "b") in order to obtain an injected representation of directory "b". Thus, directory "b" is the "parent directory" in this recursive iteration of the method 300.

According to method 300, for each child node of the parent directory "b", a statistically injective function (e.g., a hash) is performed (act 301) on the child node to obtain the injected representation (e.g., a hash of) the child node. Thus, the content of file "d" is hashed to obtain hashed result 0x1875, and the content of file "e" is hashed to obtain hashed result 0x8367. In addition, reversal information usable to reverse the injected representation back into the original content is formulated (act 302). The reversal information may be generated in a similar process as the injected representation is formed.

In one embodiment, in order to hash files, a distinction is made between small files and larger files. For instance, for small files, the file hash might be exactly the hash of the file contents. However, for larger files, those files may be divided into portions, which may be addressed by a page table. For rather larger files, the page table might have several levels. In this case, the file hash may be the hash of the top-level page table. The top-level page table contains the hashes of the pages of the next lower-level page table, and so on. In this way, larger files are processed one portion at a time, and the page table hierarchy logically lives below the file system hierarchy. For instance, if referring to FIG. 4, suppose file "e" is a large file. The hash value 0x8367 may have been obtained by the hashing of the top level in the page table. Thus, child node 415 may be thought of as representing a page table tree that is grafted into the file system hierarchy at that same point. In this case, to accomplish the grafting, the content of the injective representation at the point of the graph would represent that the node points to a page table. There is a similar flag for the other nodes that indicates whether the node is an intermediate node (such as a directory), a leaf node (such as a file), a single level page table, or a multiple level page table (along with the number of levels).

Once the hash for all of the child nodes is obtained, a statistically injection function is performed on each child injected representation (e.g., each child hash) along with at least attribute of that child node (e.g., a file system name whose representation is to be preserved in the cloud) (act 311). For instance, in FIG. 4, the hierarchy backup manager might perform a hash of the following string "d=0x1875, e=0x8367", which string included the hashes of files "d" and "e" as well as the files' corresponding names. In this case, the resulting hash for directory "b" is 0x4808. Accordingly, now there is an injected representation of directory "b". Furthermore, reversal information usable to retrieve the injected representation of each child node and its attribute is formulated (act 312). For instance, that reversal information may be used to obtain the string "d=0x1875,e=0x8367" given the input 0x4808.

The recursion then may move forward one iteration to be applied to the root directory "a" of the file system. Thus, directory "a" is the "parent directory" in this next recursive iteration of the method 300.

According to method 300, for each child node of the parent directory "a", a statistically injective function is performed (act 301) on the child node to obtain the injected representation the child node. Thus, the injected representation of directory "b" is to be obtained. However, recall that the injected representation (0x7481) of directory "b" has been obtained by the prior iteration of the method 300, hence the recursion. Accordingly, file "c" is hashed to obtain its injected representation 0x1277. In addition, reversal information usable to reverse the injected representation back into the original content is formulated (act 302).

Then, a statistically injection function is performed on each child injected representation along with at least attribute of that child node (e.g., the name) (act 311). For instance, in FIG. 4, the hierarchy backup manager might perform a hash of the following string "b/=0x4808, c=0x1277", which string included the injected representation of directory "b" obtained in the prior iteration of the method 300, as well as the hash of file "c", and as well as the child directory's and file's corresponding names. In this case, the resulting hash for directory "a" is 0x7481. Accordingly, now there is an injected representation of the root directory "a". Furthermore, reversal information usable to retrieve the injected representation of each child node and its attribute is formulated (act 312). For instance, that reversal information may be used to obtain the string "b/=0x4808, c=0x1277" given the input 0x7481.

Figure 5:
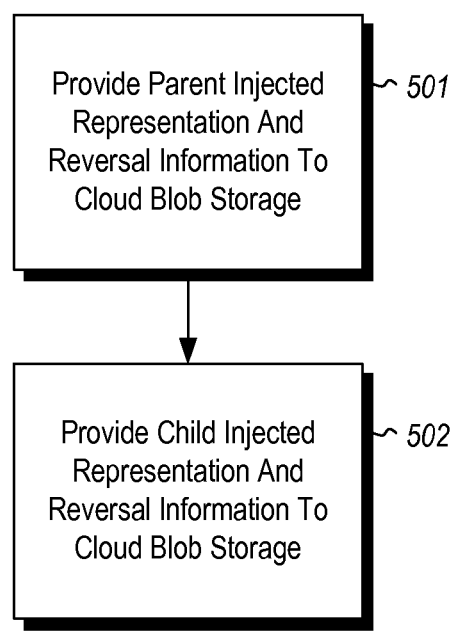
FIG. 5 illustrates a method for providing the injected representations for hierarchical system nodes into the cloud.

In accordance with act 223, the injected representations for each of at least some of the file system nodes may be provided to the cloud blob storage. FIG. 5 illustrates a method 500 for providing the injected representations for file system nodes into the cloud blob storage. Although not required, the method 500 might be performed recursively from the top of the file system hierarchy down to the leaf nodes of the file system hierarchy. Accordingly, in those embodiments, the hash for a given file system node is not provided to the cloud blob storage until the hash for the parent node is provided to the cloud blob storage. This might be helpful in situations in which the cloud blob storage garbage collects by determining if an injected representation is referred to by another injected representation. If the hash of the child node was provided first, before the hash of the parent node, this could result in such a garbage collection algorithm adjudicating the child hash as no longer referenced, and to be marked for disposal.

Accordingly, the method 500 is first performed beginning at the root directory "a" being the "parent" directory. First, the parent injected representation (e.g., the hash 0x7481 of directory "a") (and associated reversal information) is provided to the cloud blob storage (act 501) to formulate entry 421 in cloud blob storage 420. Then all of the child injected representations (e.g., the hash 0x4804 of directory b/ and the hash 0x1277 of file c) (and the associated reversal information) is provided to the cloud blob storage (act 511). For instance, act 511 might result in entry 422 and 423 in the cloud blob storage 420, along with their reversal information.

The method 500 is then again performed with respect to directory "b" being the parent directory. Of course, the hash 0x4808 of directory b and its reversal information have already been persisted in cloud blob storage (see entry 422) as one instance of act 511 and 512 in the prior performance of method 500. Accordingly, the method 500 proceeds directly to acts 511 and 512 for child nodes "d" and "e". Thus, the hash 0x1875 for file "d" and the hash 0x8367 for file "e" are persisted in the cloud blob storage (act 511) along with their reversal information (act 512). For instance, act 511 and 512 might result in entry 424 and 425 in the cloud blob storage 420.

This above description constitutes details for how the file system may be backed up initially. However, once the file system is initially backed up, there will be further updates to the contents of the file system directory. For instance, whenever a directory is added or deleted, and whenever a file is created, updated, or deleted, the contents of the file system change.

Figure 6:
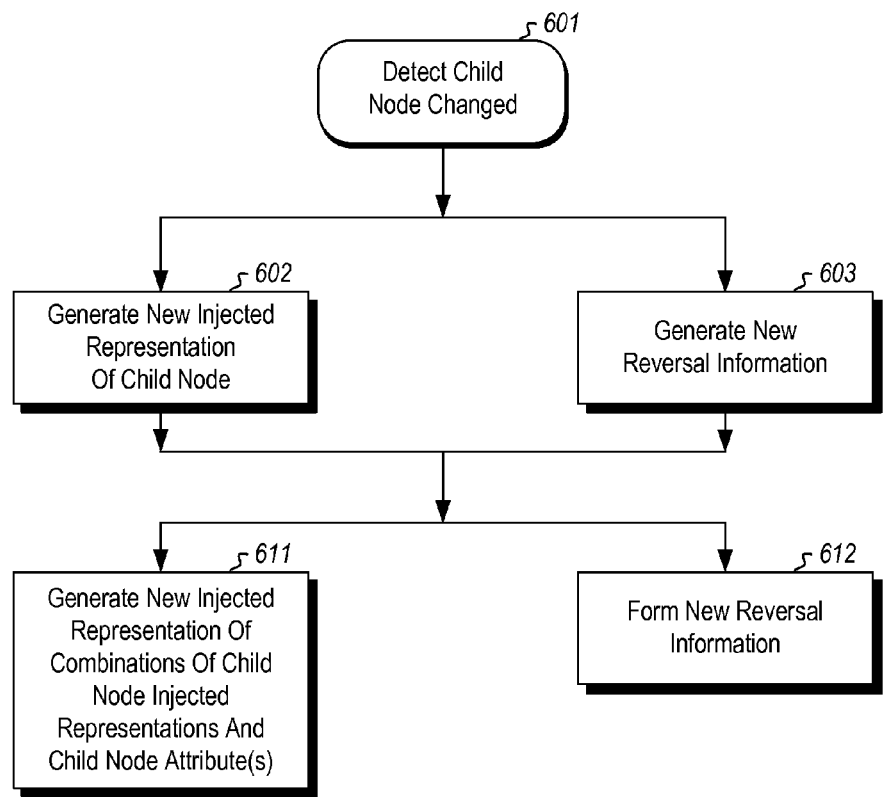
FIG. 6 illustrates a flowchart of a method for updating content of a parent node in response to a change in a child node.

FIG. 6 illustrates a flowchart of a method 600 for updating content of a parent directory in response to a change in a child node. The method 600 may be performed recursively beginning at the node that was initially changed, all the way up to the root directory of the file system. This is done bottom to top in the hierarchy Referring to FIG. 4, in a particular example, file "c" has been edited. Of course, the content of file "c" has thus changed, and the hash "0x1277" is no longer an injected representation of the updated file "c". Likewise, any directory in the ancestral chain of file "c" leading all the way up to the root directory has also had its content changed. Accordingly, those injected representations are also no longer valid.

Figure 7:
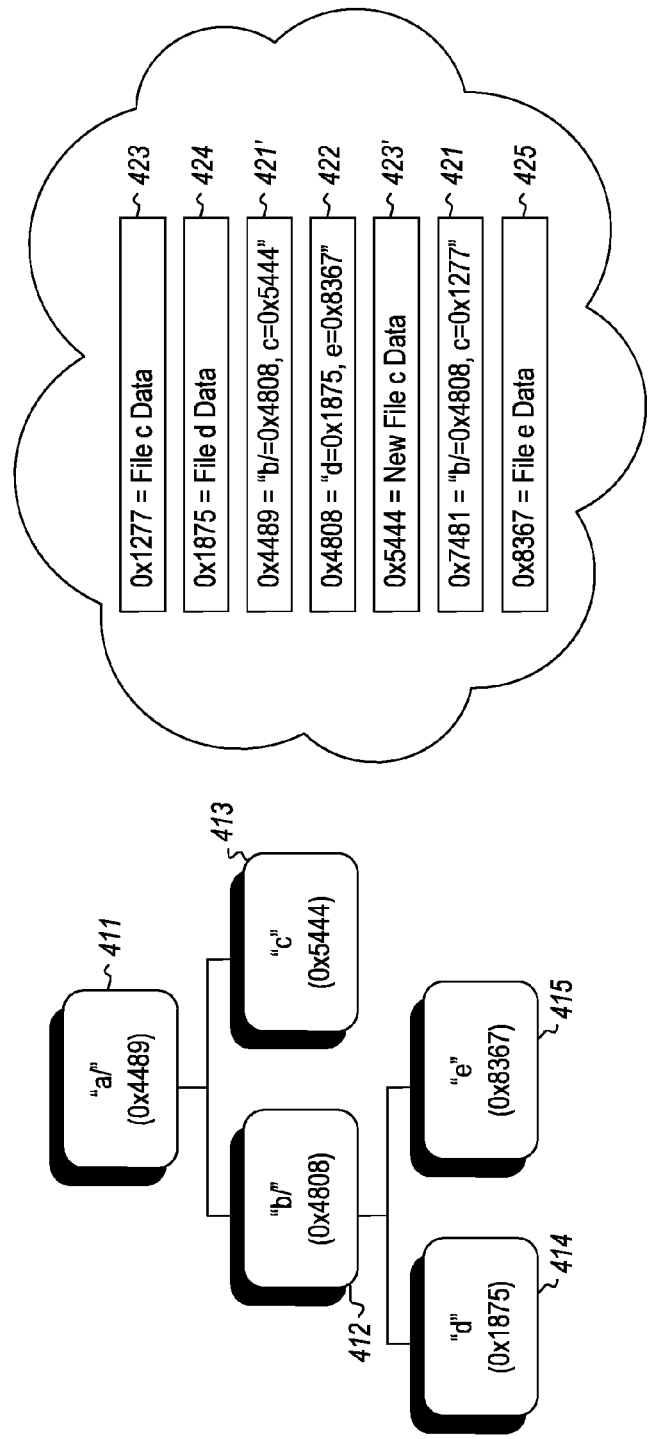
FIG. 7 illustrates a modified environment that represents a modification of the environment of FIG. 4.

FIG. 7 illustrates a modified environment 700 that represents a modification of the environment 400 of FIG. 4. The method 600 will now be described with respect to the original environment 400 of FIG. 4 and the modified environment 700 of FIG. 7.

The method 600 is triggered upon detecting that a child node in a particular parent directory has changed (act 601). In the first instance of method 600, the method detects that the file "c" has changed. Accordingly, in this first instance of the method 600, the file "c" is the "child node" and the root directory "a/" is the parent directory.

Upon detecting the update of the content of the child node (file "c"), a statistically injective function is performed on the revised content of the child node of the file system to formulate a revised child injected representation (act 602) of the child node, as well as revised child reversal information (act 603) usable to reverse the revised child injected representation back into the revised content of the child node. Acts 602 and 603 may be considered to be simply the same as acts 301 and 302, respectively, but performed with respect to the revised content of the child node, and only performed with respect to that child node (rather than all child nodes of the parent directory).

For instance, in FIG. 7, the content of file "c" is hashed to obtain a new hash 0x5444. If file "c" were a large file represented by a page table hierarchy, the method 600 actually first be performed at the leaf node of the page table. Then, the method 600 would be recursively performed until it hashes the parent node in the page table tree. Note that the injected representation and reversal information for nodes 412, 414 and 415 do not require recalculation.

The statistically injective function is then re-performed on the revised child injected representation and an attribute of the revised child node to formulate a revised parent injected representation of the parent directory (act 611), and revised parent reversal information (act 612) usable to reverse the parent representation of the directory into the revised child injected representation and the attribute of the revised child node. Acts 611 and 612 may be considered to be simply the same as acts 311 and 312, respectively, but performed using also the changed injected representation of child node 413. In FIG. 7, for example, the string "b/=0x4808,c=0x5444" is hashed to obtain the new injected representation 0x4489 of the root directory "a". If the directory "a" were not the root directory, the method 600 may be recursively performed so that that injected representations and reversal information is reformulated for each node beginning from the file (or from the file portion) all the way up the ancestral chain of the file system hierarchy (and potentially also the page table hierarchy) to the root directory.

The method 500 may then be re-performed recursively to update those change nodes into the cloud blob storage. For instance, the entry 421' for the root directory "a/" might first be created in the cloud blob storage, followed by the entry 423' for the changed file "c". Note that the prior entry 421 for the root directory "a/" and the prior entry 423 for the file "c" still remain in the cloud blob storage. This may be done because the hashes themselves (and associated reversal information) are relatively small, especially compared to cloud blob storage capabilities. Also, this allows the file system change to be easily undone, by simply reverting back to the prior entries 421 and 423.

The above describes the backing up of a file system in a manner that preserves versioning. However, the reverse process of the backup operation may be performed to restore content. For instance, suppose that file "c" was somehow lost on the operating computing system 110. The hierarchy backup manager 113 may thus retrieve the entry 423 (or 423' if restoring to the updated version), and use the reversal information to reformulate the content of file "c" from the injected representation of the file "c". The hierarchy backup manager 113 might have also begun by retrieving the entry 421 (or 421' if restoring to the updated version), and used the reversal information to thereby recovered the string "b/=0x4808,c=x5444"). In order to do this, there would also be some identification of the path of interest to arrive at the file. This gives the child injected representation of file "c", from which (using also the reversal information for file "c"), the content of file "c" may be restored. If the entire file system was lost, this process could be repeated from top down, since the child injected representations (and also the name) of each child node of a directory may be obtained from the injected representation of the parent node.

Figure 8:
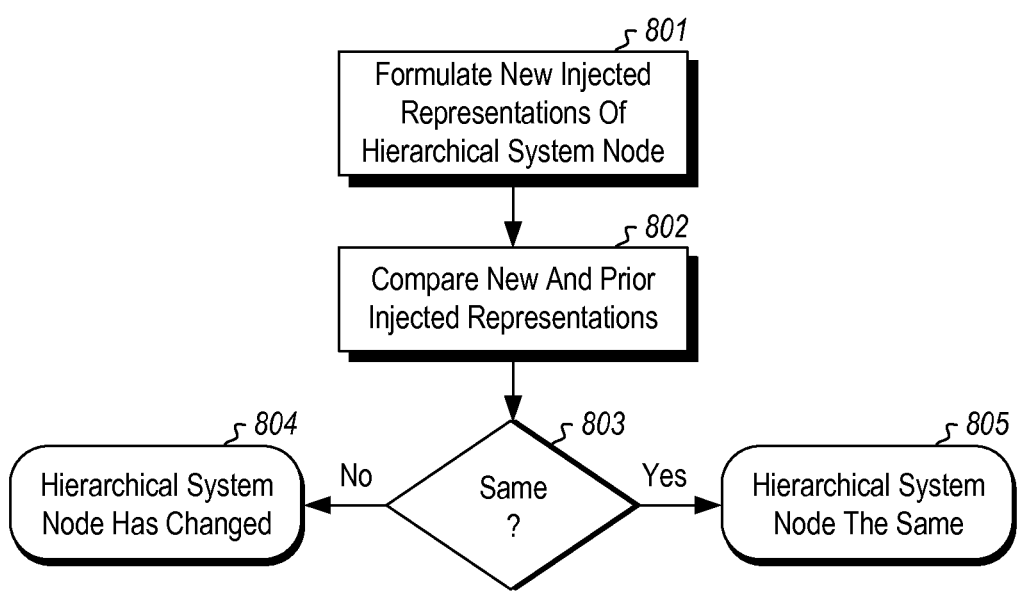
FIG. 8 illustrates a flowchart of a method for determining whether a particular hierarchical system node has changed since a particular point in time.

Differencing is also simplified using the principles described herein. For instance, to determine whether a particular file system node has changed since a particular point in time, method 800 of FIG. 8 might be pursued. For instance, the injected representation of the particular file system node is formulated (act 801). This may be accomplished by recursively performing method 300 from the top of the file system hierarchy downward using an identified path until the injected representation of the particular file system node is formulated.

The reformulated injected representation is then compared (act 802) with the prior injected representation that represents the content of that file system node at the particular prior instant in time. If there is not a match ("No" in decision block 803), then the content has changed (decision 804). If there is an exact match ("Yes" in decision block 803), then the content has not changed (decision 805).

Computing systems are important to the implementation of the principles described herein. For instance, the above described operating computing system 110 may be a computing system itself. Furthermore, the snapshot module 111, the change journal module 112, and the hierarchy backup manager may each be modules that operate upon the computing system. For instance, such modules might be operated and/or instantiated in response to one or more processors of the computing system running one or more computer-executable instructions that are embodied on one or more computer-readable storage media that form a computer program product that is accessed by the computing system. Accordingly, a general computing system will now be described with respect to FIG. 9.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

Figure 9:
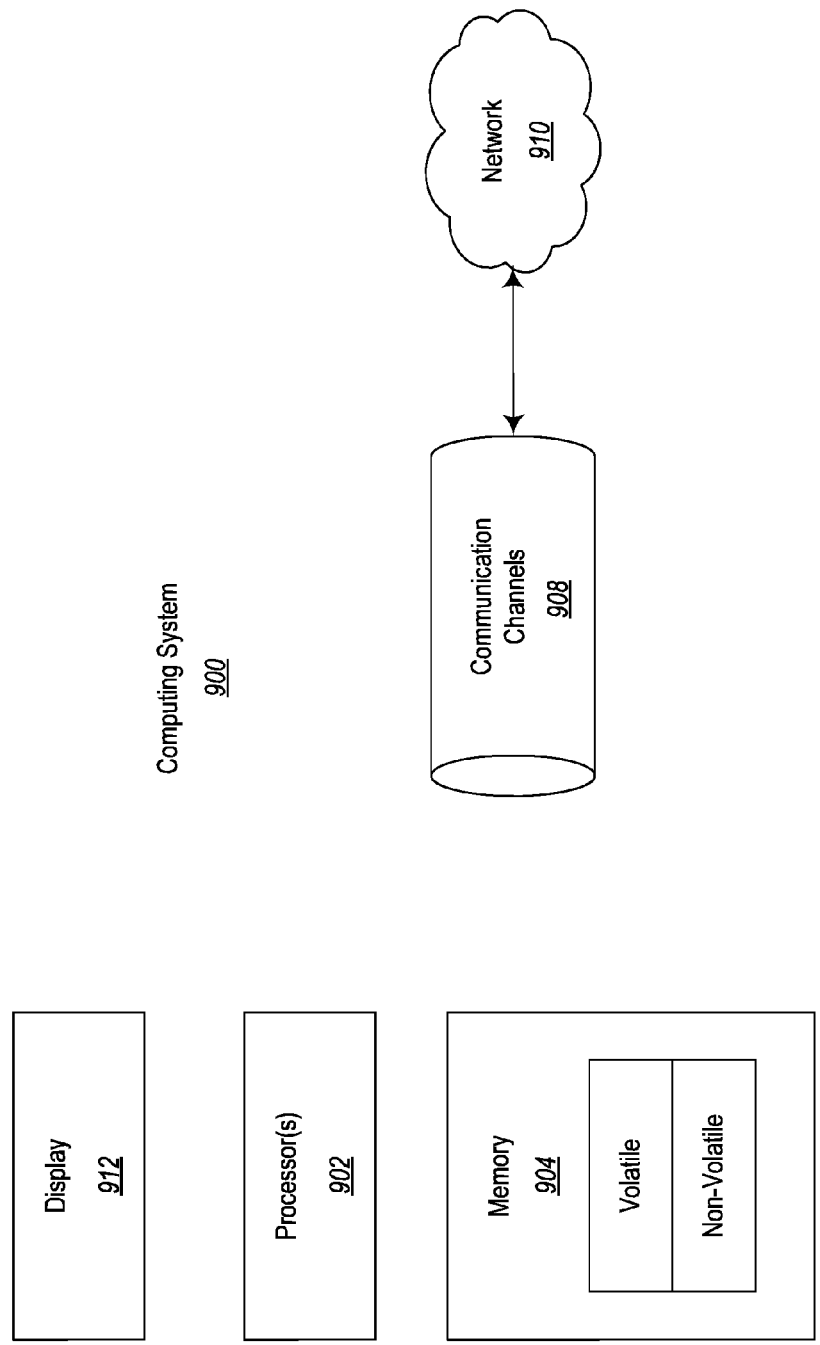
FIG. 9 illustrates an example computing system in which the principles described herein may be employed.

As illustrated in FIG. 9, in its most basic configuration, a computing system 900 typically includes at least one processing unit 902 and memory 904. The memory 904 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 904 of the computing system 900. Computing system 900 may also contain communication channels 908 that allow the computing system 900 to communicate with other message processors over, for example, network 910. The computing system 900 may also have a display 912 for displaying to a user.

Embodiments described herein may comprise or utilize a special-purpose or general-purpose computer system that includes computer hardware, such as, for example, one or more processors and system memory, as discussed in greater detail below. The system memory may be included within the overall memory 904. The system memory may also be referred to as "main memory", and includes memory locations that are addressable by the at least one processing unit 902 over a memory bus in which case the address location is asserted on the memory bus itself. System memory has been traditional volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for remotely preserving content of a parent node in a hierarchical system into cloud blob storage, the method comprising:
    an act of performing a statistically injective function on content of a child node of a hierarchical system to formulate a child injected representation of the child node, as well as child reversal information usable to reverse the child injected representation back into the content of the child node;
    an act of performing a statistically injective function on at least the child injected representation and an attribute of the child node to formulate a parent injected representation of the parent node, and parent reversal information usable to reverse the parent injected representation of the parent node into the child injected representation and the attribute of the child node;
    an act of providing the parent injected representation and the parent reversal information to cloud blob storage; and
    an act of providing the child injected representation and the child reversal information to the cloud blob storage.

2. The method in accordance with claim 1, the act of providing the child injected representation to the cloud blob storage occurring after the act of providing the parent injected representation to the cloud blob storage.

3. The method in accordance with claim 1, further comprising:
    an act of performing a statistically injective function on content of a second child node of the hierarchical system to formulate a second child injected representation of the second child node, as well as second child reversal information usable to reverse the second child injected representation back into the content of the second child node.

4. The method in accordance with claim 1, further comprising an act of updating content of the parent node, the act of updating comprising:
    an act of updating content of the child node in the hierarchical system to generated revised content of the child node;
    an act of performing a statistically injective function on revised content of the child node of the file system to formulate a revised child injected representation of the child node, as well as revised child reversal information usable to reverse the revised child injected representation back into the revised content of the child node;
    an act of performing a statistically injective function on the revised child injected representation and an attribute of the revised child node to formulate a revised parent injected representation of the parent node, and revised parent reversal information usable to reverse the parent representation of the parent node into the revised child injected representation and the attribute of the revised child node;
    an act of providing the revised parent injected representation and the revised parent reversal information to the cloud blob storage; and
    an act of providing the revised child injected representation to the cloud blob storage.

5. The method in accordance with claim 4, the act of providing the revised child injected representation to the cloud blob storage occurring after the act of providing the revised parent injected representation and the revised parent reversal information to the cloud blob storage.

6. The method in accordance with claim 1, further comprising an act of restoring content of the child node, the act of restoring comprising:
    an act of using the child injected representation to retrieve the child reversal information; and
    an act of using the child injected representation and the child reversal information to obtain the content of the child node.

7. The method in accordance with claim 6, the act of restoring content of the first child node further comprising:
    an act of using the parent injected representation to retrieve the parent reversal information; and
    an act of using at least the parent injected representation and the parent reversal information to obtain the child injected representation.

8. The method in accordance with claim 7, the act of restoring content of the first child node being performed as part of the act of restoring the parent directory, the act of restoring the parent directory further comprising:
    an act of using the parent reversal information to restore the content of the parent directory.

9. The method in accordance with claim 1, further comprising an act of determining whether the parent node has changed since the parent injected representation was formulated, the method comprising:
    an act of re-formulating the parent injected representation of the parent directory;
    an act of comparing the reformulated parent injected representation with the prior parent injected representation;
    if the re-formulated parent injected representation is different than the prior parent injected representation, an act of concluding that the content of the parent node has changed; and
    if the re-formulated parent injected representation is the same as than the prior parent injected representation, an act of concluding that the content of the parent node has not changed.

10. The method in accordance with claim 1, further comprising an act of determining whether the child node has changed since the child injected representation was formulated, the method comprising:
    an act of obtaining a re-formulation of the child injected representation;
    an act of comparing the reformulated child injected representation with the prior child injected representation;
    if the re-formulated child injected representation is different than the prior child injected representation, an act of concluding that the content of the child node has changed; and
    if the re-formulated child injected representation is the same as the prior child injected representation, an act of concluding that the content of the child node has not changed.

11. The method in accordance with claim 1, the act of re-formulating the child injected representation comprising:
    an act of detecting one or more portions of the child node that has changed;
    for each of the detected changed portions, an act of performing a statistically injective function on the portion of a child node to formulate a portion injected representation; and
    an act of re-formulating the child injected representation using the one or more portion injected representations.

12. The method in accordance with claim 1, the parent node being a root directory of the file system.

13. The method in accordance with claim 1, the child node being file of the file system.

14. The method in accordance with claim 1, the child node being a child directory of the parent directory in the file system.

15. The method in accordance with claim 14, the act of performing a statistically injective function on the content of the child node of the file system further comprising:
- an act of performing a statistically injective function on content of a grandchild node of the file system to formulate a grandchild injected representation of the grandchild node, as well as grandchild reversal information usable to reverse the child injected representation back into the content of the grandchild node, the grandchild node being a child directory or file in a the child directory of the file system;
- an act of performing a statistically injective function on at least the grandchild injected representation and an attribute of the grandchild node to formulate the child injected representation of the child node, and the child reversal information.

16. The method in accordance with claim 15, further comprising:
- an act of providing the grandchild injected representation and the grandchild reversal information to the cloud blob storage.

17. The method in accordance with claim 16, the act of providing the grandchild injected representation to the cloud blob storage occurring after the act of providing the child injected representation to the cloud blob storage.

18. A computer system comprising:
- one or more processors;
- one or more computer-readable storage media containing computer-executable instructions which, when executed by the one or more processors, cause the computer system to instantiate an architecture comprised of components that backup a hierarchical file system operating at the computer system by performing the following:
  - a change journal that identifies which portions of multi-portion files in the hierarchical file system have changed since the time of a prior file system snapshot;
  - a hierarchy backup manager that performs the following in response to a determination that the file system is to be backed up:
    - an act of obtaining a prior injected representation of the file system corresponding to the prior file system snapshot, and prior file system reversal information corresponding to the prior file system snapshot;
    - an act of formulating a file system hierarchy as that file system existed in the prior file system snapshot using the injected representation;
    - an act of formulating a changed file system hierarchy using the change journal, the changed file system hierarchy being changed in at least one of hierarchical structure and changed files;
    - an act of formulating an updated injected representation of the file system and updated file system reversal information using the changed file system hierarchy; and
    - an act of causing the updated injected representation of the file system and the updated file system reversal information to be stored at cloud blob storage.

19. A computer program product comprising one or more computer-readable storage media having thereon computing-executable instructions that are structured such that, when executed by one or more processors of a computing system, cause the computing system to perform the following:
- an act of obtaining a prior injected representation of the file system corresponding to a prior file system snapshot, and prior file system reversal information corresponding to the prior file system snapshot;
- an act of formulating a prior file system hierarchy as that file system existed in the prior file system snapshot using the prior injected representation;
- an act of formulating a second file system hierarchy using a change journal representing changes to the file system as of a second instant in time since the prior file system snapshot;
- an act of formulating a second injected representation of the file system and second file system reversal information using the second file system hierarchy; and
- an act of causing the second injected representation of the file system and the second file system reversal information to be provided to cloud blob storage.

20. The computer program product in accordance with claim 19, the computer-executable instructions being further structured such that, when executed by one or more processors of the computing system, cause the computing system to perform the following:
- an act of tracking changes to the file system since the second instant in time using a change journal;
- an act of formulating the second file system hierarchy as that file system existed at the second instant in time using the second injected representation;
- an act of formulating a third file system hierarchy using the change journal that represents changes to the file system since the second instant in time;
- an act of formulating a third injected representation of the file system and third file system reversal information using the third file system hierarchy; and
- an act of causing the third injected representation of the file system and the third file system reversal information to be provided to the cloud blob storage.

* * * * *